Dec. 23, 1941.  W. G. KÖGEL  2,267,278
REFRIGERATION
Filed Dec. 23, 1938  3 Sheets-Sheet 1

INVENTOR.
Wilhelm Georg Kögel
BY
D. E. Heath
ATTORNEY.

Dec. 23, 1941  W. G. KÖGEL  2,267,278
REFRIGERATION
Filed Dec. 23, 1938   3 Sheets-Sheet 3

INVENTOR.
Wilhelm Georg Kögel
BY D. E. Heath
ATTORNEY.

Patented Dec. 23, 1941

2,267,278

UNITED STATES PATENT OFFICE 2,267,278

REFRIGERATION

Wilhelm Georg Kögel, Evansville, Ind., assignor, by mesne assignments, to Servel, Inc., New York, N. Y., a corporation of Delaware Application December 23, 1938, Serial No. 247,399

5 Claims. (Cl. 62—119.5)

My invention relates to pressure equalized absorption refrigeration systems, and it is an object of the invention to provide a pipe coil type condenser in such a system which affords auxiliary pressure equalizing fluid storage and temporary refrigerant fluid accumulation with simple structure having small space requirements as set forth in the following description and accompanying drawings forming part of this specification, and of which:

Figure 1:
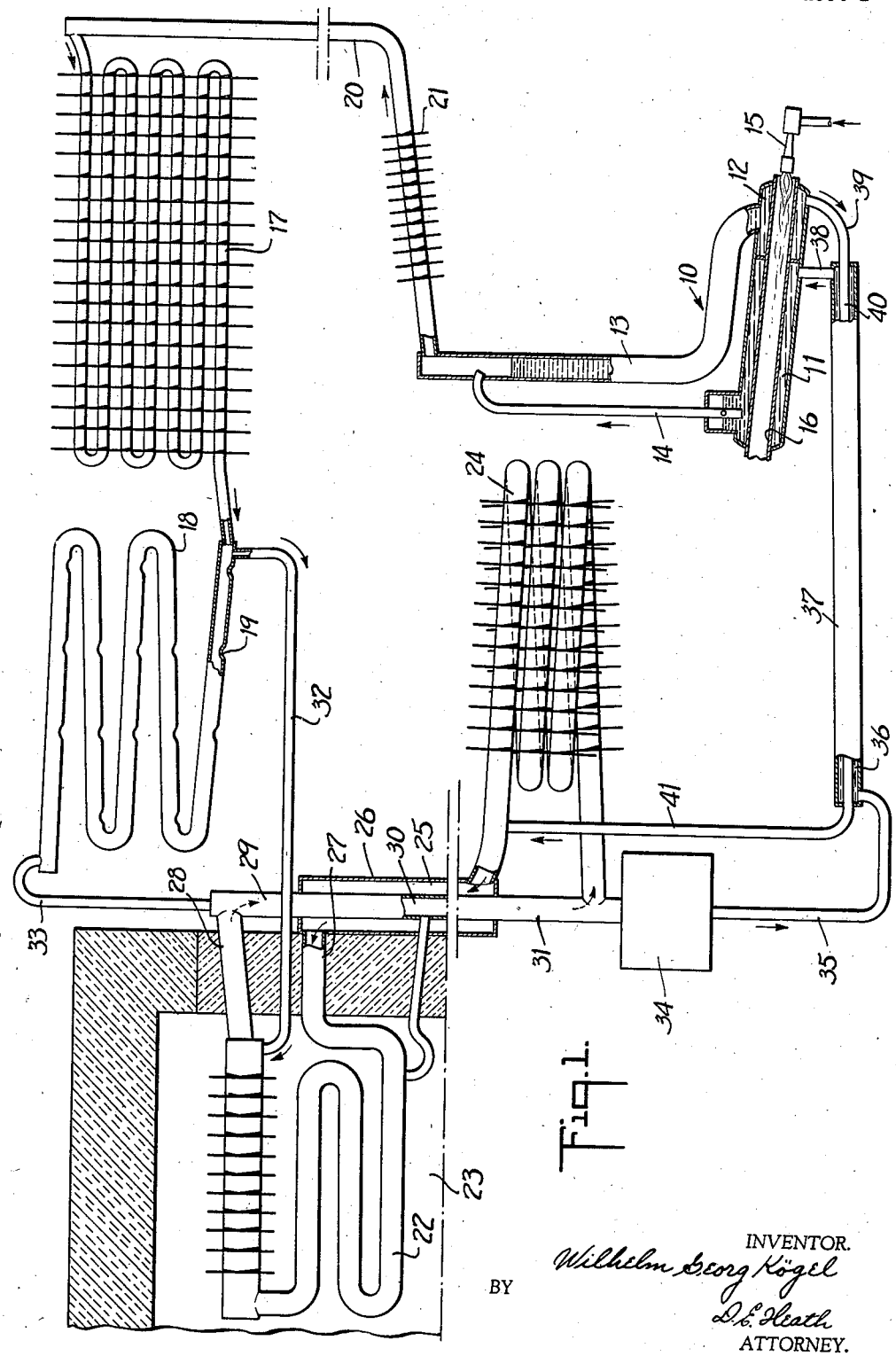
Fig. 1 shows more or less diagrammatically a refrigeration system embodying the invention.

Referring to Fig. 1, a generator 10 has a chamber 11, a chamber 12, a standpipe 13 having its lower end connected to chamber 12, and a thermosyphon or vapor lift conduit 14 connected from chamber 11 to the upper part of standpipe 13. The generator is heated by a burner 15 arranged so that the flame is projected into a flue 16 which extends through the chambers 11 and 12.

A condenser is composed of a finned pipe coil section 17 and a second pipe coil section 18. The lower ends of sections 17 and 18 are connected together. In the bottom of the pipe forming condenser section 18 are a series of indentations 19. The upper end of condenser section 17 is connected by a conduit 20 to the upper end of generator standpipe 13. A portion of conduit 20 is provided with rectifier fins 21.

A pipe coil type evaporator 22 is located in a refrigerator storage compartment 23. An absorber 24 is formed by a finned pipe coil. The upper end of absorber 24 is connected by outer passage 25 of a gas heat exchanger 26 and a conduit 27 to the lower end of evaporator 22. The upper end of evaporator 22 is connected by a conduit 28, a conduit 29, the inner passage 30 of gas heat exchanger 26, and a conduit 31 to the lower end of absorber 24. The upper end of evaporator 22 is connected by a conduit 32 to the lower end of condenser section 18. The upper end of condenser section 18 is connected by a conduit 33 to conduit 29.

The lower end of absorber 24 is connected by conduit 31 to the top of an absorber vessel 34. The bottom of vessel 34 is connected by a conduit 35, outer passage 36 of a liquid heat exchanger 37, and conduit 38 to generator chamber 11. Generator chamber 12 is connected by a conduit 39, inner passage 40 of liquid heat exchanger 37, and conduit 41 to the upper end of absorber 24.

The above described apparatus is evacuated and charged with a solution of refrigerant fluid in absorption liquid, such as a 30% solution of ammonia in water, and an inert auxiliary pressure equalizing fluid, such as hydrogen. The condenser, absorber, and rectifier are air cooled. The generator is heated by burner 15. In the generator, ammonia vapor is expelled from solution in chambers 11 and 12. Vapor in chamber 11 rises through conduit 14, causing upward flow of liquid in this conduit into standpipe 13. Vapor in chamber 12 rises through liquid to the upper end of standpipe 13.

Ammonia vapor flows from the upper end of standpipe 13 through conduit 20 to the condenser 17, 18. Ammonia vapor is condensed to liquid in the condenser and flows through conduit 32 into the upper end of evaporator 22. Liquid ammonia flows downward in evaporator 22 and evaporates and diffuses into hydrogen, producing a refrigerating effect for cooling refrigerator compartment 23.

Rich gas flows from the upper end of evaporator 22 through conduit 28, conduit 29, heat exchanger 26, and conduit 31 into absorber 24. Ammonia vapor is absorbed into solution in absorber 24. Weak gas flows from the upper end of absorber 24 through gas heat exchanger 26 and conduit 27 back to evaporator 22.

Strong solution flows from the lower end of absorber 24 through conduit 31 into absorber vessel 34 and thence through conduit 35, liquid heat exchanger 37, and conduit 38 to generator chamber 11. Weak absorption liquid flows from generator chamber 12 through conduit 39, liquid heat exchanger 37 and conduit 41 into the upper end of absorber 24.

During operation of the system at ordinary room temperatures, condensation of ammonia vapor to liquid all takes place in the condenser section 17. During this time condenser section 18 is filled with hydrogen gas and contains ammonia vapor at a very low partial pressure. Thus section 18 acts as a storage vessel for reserve hydrogen. At high loads, as upon increase in room temperature, ammonia vapor passes from condenser section 17 into condenser section 18. Ammonia vapor entering coil 18 displaces hydrogen therefrom through conduit 33 into the evaporator-absorber gas circuit, whereby the pressure throughout the system is uniformly increased. On increase in pressure, ammonia condenses in both condenser sections 17 and 18 and the liquid ammonia flows from the condenser through conduit 32 to the evaporator as described. Under these conditions of operation, however, some liquid ammonia formed by condensation in condenser coil 18 is retained in this condenser section by the dams formed by indentations 19. Thus, some liquid ammonia is trapped in condenser section 18 out of circulation in the circuit. This causes a reduction in the average concentration of solution in the generator-absorber liquid circuit, whereby the capacity of the system is increased.

Figure 2:
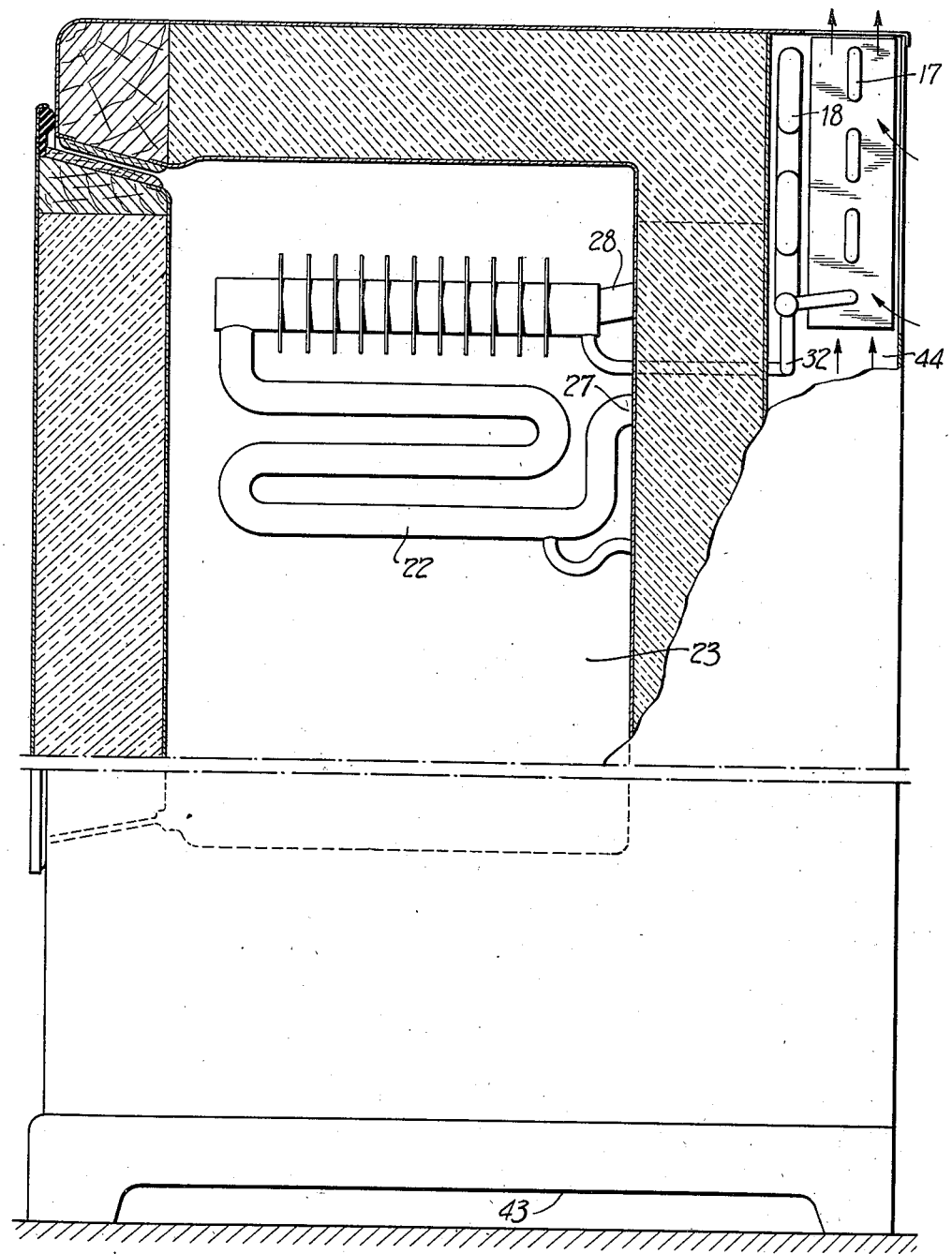
Fig. 2 is a side view of a refrigerator, partly broken away, showing parts of the system in Fig. 1 mounted in a refrigerator cabinet.

Fig. 2 shows in side elevation a refrigerator cabinet 43 containing a refrigeration apparatus system like that described in connection with Fig. 1. Part of the cabinet is broken away to show the evaporator 22 and condenser sections 17 and 18. The evaporator 22 is located in the upper part of the refrigerator storage compartment 23. The finned condenser section 17 and condenser section 18 are located side by side in the upper part of a flue space 44 in the rear of the refrigerator cabinet. The pipe or tubing forming the flat pipe coil 18 is larger in diameter than the tubing forming the condenser section 17 to afford a large storage capacity for hydrogen.

Figure 3:
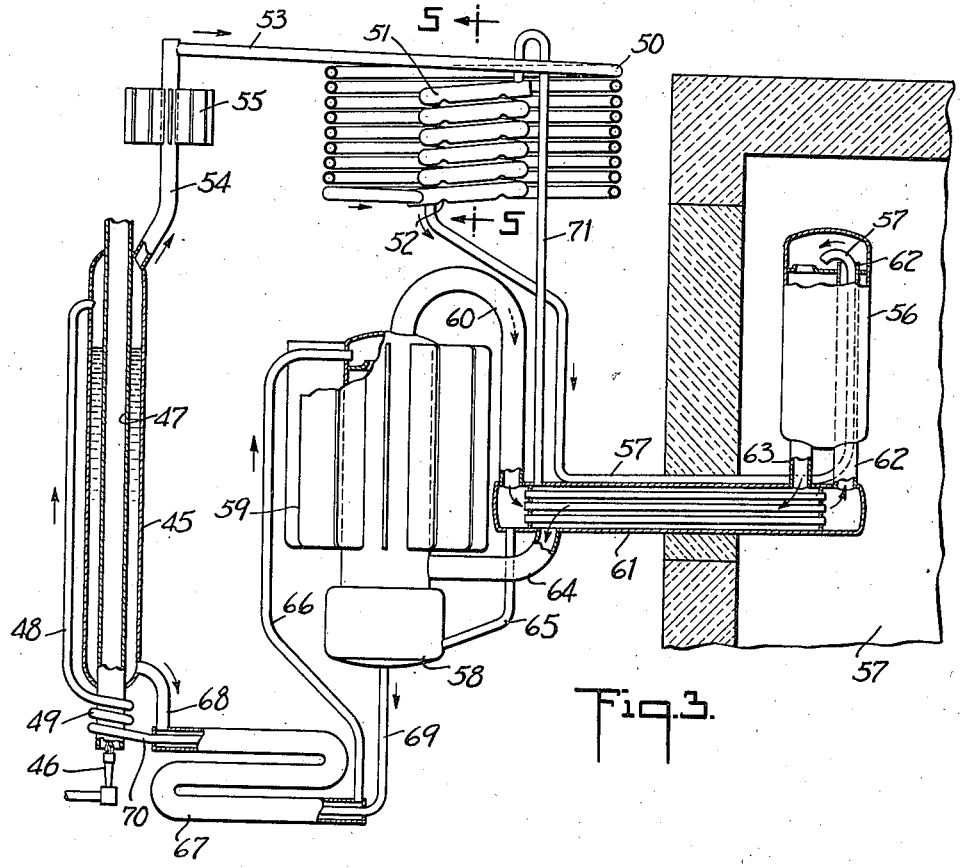
Fig. 3 shows more or less diagrammatically a refrigeration system embodying a modified form of the invention.
Figure 4:
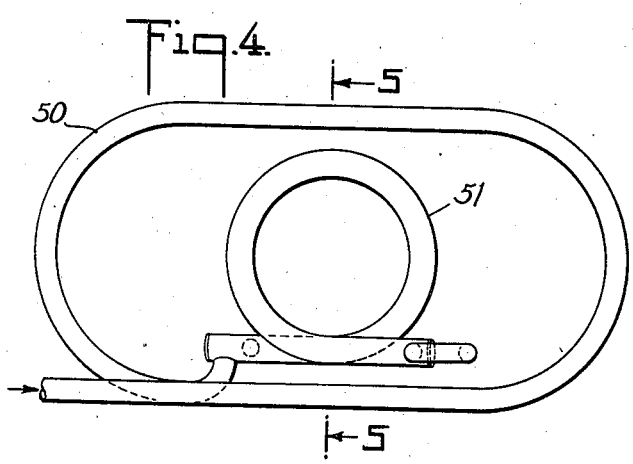
Fig. 4 is a top view of a part of the apparatus in Fig. 3.
Figure 5:
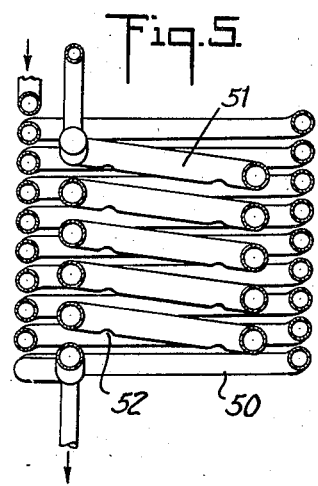
Fig. 5 is a detail sectional view on line 5—5 in Figs. 3 and 4.

In Figs. 3, 4, and 5 a condenser in accordance with the present invention is shown as concentric pipe coils. The refrigeration system illustrated in Fig. 3 is charged and operates like that described in connection with Fig. 1 but the apparatus parts are slightly different in form. A generator 45 is heated by a burner 46 arranged so that the flame projects upward in the lower end of a flue 47 which extends upward through the generator. A thermosyphon or vapor lift conduit 48 has a portion 49 coiled about the lower end of flue 47. The upper end of conduit 48 is connected to the upper part of generator 45.

A condenser comprises an outer pipe coil 50 and an inner pipe coil 51. The lower ends of coils 50 and 51 are connected together. The tubing forming coil 51 is larger in diameter than the tubing of coil 50. In the bottom of the tubing forming coil 51 are a series of indentations 52. The upper end of coil 50 is connected by a conduit 53 and a conduit 54 to the upper part of generator 45. Conduit 54 is provided with rectifier fins 55.

An evaporator 56 is located in a refrigerator storage compartment 57. The upper part of evaporator 56 is connected by a conduit 57 to the lower ends of condenser coils 50 and 51.

An absorber 58 is provided with heat radiation fins 59 for air cooling. The upper part of absorber 58 is connected by a conduit 60, a gas heat exchanger 61, and a conduit 62 to the upper part of evaporator 56. The lower part of evaporator 56 is connected by a conduit 63, gas heat exchanger 61, and conduit 64 to the lower part of absorber 58. A drain conduit 65 is connected from the gas heat exchanger 61 to the bottom of absorber 58.

The upper part of absorber 58 is connected by a conduit 66, a liquid heat exchanger 67, and a conduit 68 to the lower end of generator 45. The bottom of absorber 58 is connected by a conduit 69, liquid heat exchanger 67, and a conduit 70 to the lower end of vapor lift coil 49.

The general principles of operation of this system are like that described in connection with Fig. 1. The heat of burner 46 causes expulsion of ammonia vapor from solution in generator 45 and coil 49. Vapor rising from coil 49 through conduit 48 causes circulation of absorption liquid in the generator-absorber liquid circuit. Ammonia vapor flows from the generator through conduits 54 to 53 to the condenser section 50. Liquid ammonia flows from the condenser through conduit 57 into evaporator 56. Hydrogen circulates in the absorber-evaporator circuit. Liquid ammonia evaporates and diffuses into the hydrogen in evaporator 56. Ammonia vapor is absorbed out of the gas into solution in the absorber 58. The upper end of condenser section 51 is connected by a conduit 71 to the gas heat exchanger 61. During operation of the system at ordinary room temperatures, all the ammonia vapor condenses in section 50. Upon increase in room temperature, ammonia vapor enters condenser section 51 and displaces hydrogen from this coil through conduit 71 into the absorber-evaporator circuit. Upon the resulting increase in pressure, condensation of ammonia vapor again takes place in both condenser sections and liquid ammonia flows into the evaporator as described. Some ammonia condensate is retained in condenser section 51 by the dams formed by indentations 52 so that the average concentration of ammonia in the generator-absorber liquid circuit is lowered and the capacity of the apparatus thus increased.

What is claimed is:

1. In a refrigeration system having a generator-absorber liquid circuit and an evaporator-absorber auxiliary inert gas circuit, a condenser comprising a plurality of upright pipe coils connected at their lower ends for flow of condensate therefrom to the evaporator, a connection for vapor from the generator to one of said coils, and a connection from the upper end of another of said coils to said gas circuit.

2. In a refrigeration system having a generator-absorber liquid circuit and an evaporator-absorber auxiliary inert gas circuit, a condenser comprising a plurality of upright pipe coils connected at their lower ends for flow of condensate therefrom to the evaporator, a connection for vapor from the generator to one of said coils, and a connection from another of said coils to said gas circuit, said pipe coils being flat and located side by side in parallel planes.

3. In a refrigeration system having a generator-absorber liquid circuit and an evaporator-absorber auxiliary inert gas circuit, a condenser comprising a plurality of upright pipe coils connected at their lower ends for flow of condensate therefrom to the evaporator, a connection for vapor from the generator to one of said coils, and a connection from another of said coils to said gas circuit, said second-mentioned coil being located inside said first-mentioned coil.

4. In a refrigeration system having a generator-absorber liquid circuit and an evaporator-absorber auxiliary inert gas circuit, a condenser comprising a plurality of upright pipe coils connected at their lower ends for flow of condensate therefrom to the evaporator, a connection for vapor from the generator to one of said coils, a connection from another of said coils to said gas circuit, said second-mentioned coil being formed of pipe or tubing having a larger diameter than that forming said first-mentioned coil, and said second-mentioned coil having means for forming pools of liquid condensate therein.

5. In combination with a refrigerator cabinet having a storage compartment and an air-flow compartment outside of the storage compartment, a refrigeration system having a generator-evaporator liquid circuit and an evaporator-absorber inert gas circuit, a condenser comprising a plurality of upright pipe coils connected at their lower ends for flow of condensate therefrom to the evaporator, a connection for vapor from the generator to one of said coils, and a connection from another of said coils to said gas circuit, said coils being flat and located side by side in said air-flow compartment.

WILHELM GEORG KÖGEL.